United States Patent

[11] 3,622,653

[72] Inventors Herbert Schuster
 Cologne-Stammheim;
 Karl Nutzel, Opladen; Karl Dinges,
 Odenthal; Harry Rohr, Leverkusen, all of
 Germany
[21] Appl. No. 803,416
[22] Filed Feb. 28, 1969
[45] Patented Nov. 23, 1971
[73] Assignee Farbenfabriken Bayer Aktiengesellschaft
 Leverkusen, Germany
[32] Priority Mar. 13, 1968
[33] Germany
[31] P 17 20 802.5

[54] GRAFTS OF VINYL OR VINYLIDENE MONOMERS ONTO POLYMERIZED CYCLOPENTENE
 5 Claims, No Drawings

[52] U.S. Cl............................................. 260/881,
 260/9, 260/23 P, 260/23 S, 260/23 H, 260/29.6
 RB, 260/31.2 R, 260/33.4 R, 260/45.85,
 260/45.95, 260/876 R, 260/885

[51] Int. Cl..................................................... C08f 15/40,
 C08f 19/18
[50] Field of Search........................................... 260/880,
 881

[56] References Cited
 UNITED STATES PATENTS
 2,994,683 8/1961 Calvert......................... 260/880
 3,449,471 6/1969 Weitzel et al. ................ 260/880
 FOREIGN PATENTS
 1,020,176 2/1966 Great Britain................ 260/880

*Primary Examiner*—Murray Tillman
*Assistant Examiner*—J. Seibert
*Attorney*—Connolly and Hutz ABSTRACT: Thermoplastic-elastic moulding compositions from 5 to 50 percent by weight of a polypentenamer as a grafting base and from 95 to 50 parts by weight of a vinyl or vinylidene compound and a process for producing these compositions by graft polymerizing the vinyl or vinylidene compound in the presence of the polypentenamer e.g. in emulsified form.

GRAFTS OF VINYL OR VINYLIDENE MONOMERS ONTO POLYMERIZED CYCLOPENTENE

This invention relates to graft polymerization reactions in which Polypentenamer is used as the grafting base. Polypentenamer is a synthetic rubber obtained by ring-opening polymerization of cyclopentene. The rubber itself and the process for its production are described in U.S. Pat. No. 3,074,918 and in British Pat. Nos. 1,010,860 and 1,062,367. Although polypentenamers may be stero-irregular, they may also have predominantly cis or trans bonds. For the purposes of this invention it is preferred to use a polypentenamer with predominantly (more than 80 percent) trans bonds.

It has been found that thermoplastic-elastic moulding compositions can be obtained by polymerizing one or more vinyl or vinylidene compounds in the presence of a Polypentenamer.

The Polypentenamer is preferably used in a quantity of from about 5 to 50 parts by weight and the monomer(s) to be grafted on is preferably used in a quantity of from 95 to 50 parts by weight. Suitable graft monomers include any radically polymerizable vinyl or vinylidene compounds such as styrene and its derivatives (nuclear- and/or side-chain-alkylated styrenes, for example, α-methyl styrene), fumeric acid esters, acrylic and methacrylic esters (methyl methacrylate or ethyl acrylate) and nitrile compounds containing a vinyl group (such as acrylonitrile or methacrylonitrile). Polymerization may be carried out by the usual methods, for example, by block, solution, suspension or emulsion polymerization. One preferred method is a two-stage process in which mass or block polymerization is initially carried out, for which purpose the Polypentenamer is dissolved in the monomers up to an approximately 10 to 30 percent conversion, after which the resulting mixture is dispersed in an aqueous phase and the dispersion thus obtained is polymerized to completion. This mixture is referred to below as a graft polymer. Although catalysts and suitable aqueous phases are described in detail in the following particular embodiments, they are generally applicable.

In particular, it has been found that thermoplastic-elastic moulding compositions showing significant improvements in their technological properties, particularly their resistance to ageing, processing properties and hardness, may readily be obtained by subjecting to polymerization of a solution of A. 5 to 20 parts by weight of a Polypentenamer in B. 95 to 80 parts by weight of styrene or monomer mixtures of styrene/acrylonitrile in a ratio of 100:0 preferably 95:5 to 50:50, in which all or part of the styrene may be replaced by side-chain- or nuclear-substituted styrene (substituent preferably alkyl having 1–4 C-atoms) or methyl methacrylate, and all or part of the acrylonitrile by methacrylonitrile or esters of acrylic, methacrylic or fumaric acid, and in which the esters in the alcohol component may contain from 1–4 carbon atoms. At least some of the monomers B are graft-polymerized onto the polymer. It is also possible to polymerized only some of the monomers B (preferably more than 50 percent) in the presence of polymer A and to add the rest of the monomers B in the form of a separately prepared copolymer. The gross composition of this mixture should also correspond to the ratio of A and B indicated above.

The use of Polypentenamers as graft bases for thermoplastic-elastic moulding compositions has not been described before. Accordingly, the technological properties of the moulding compositions according to the invention were also unknown. The thermoplastic-elastic moulding compositions obtained by using Polypentenamer as a graft base show improved resistance to aging, better processing properties and a greater hardness than conventional moulding compositions produced with emulsion polybutadiene or cis-polybutadiene as the graft base. Surprisingly, the thermoplastic-elastic moulding compositions have the same notched impact strength as conventional moulding compositions prepared with emulsion polybutadiene or cis-polybutadiene as the graft base; this had not been expected in view of the high melting point and crystallizability of Polypentenamers, trans-Polypentenamer in particular (cf. Angewandte Chemie 76 (1964), pages 765–772).

In a preferred embodiment of the process according to the invention, 5 to 20 parts by weight of Polypentenamer are dissolved in the first stage in 95 to 80 parts by weight of styrene or a mixture of styrene and acrylonitrile in a ratio of from 95:5 to 50:50, in which both the styrene and the acrylonitrile may be replaced either wholly or in part by methyl methacrylate.

Dissolution is carried out at temperatures of from 20° to 70° C. in the presence of from 0.01 to 0.3 part by weight of a substituted phenol antioxidant such as, for example, 2,2'-dihdroxy-3,3'-di-tert.-butyldiphenylmethane, 2,2'-dihydroxy-3,3'-dicyclohexyldiphenylmethane or 2,6-di-tert.-butyl-4-methylphenol and/or a phosphorous acid ester antioxidant such as tris-nonylphenylphosphite, for example.

Mercaptanes, for example, tert.-dodecylmercaptan, may be added to the solution as molecular weight regulators, depending upon the required molecular weight of both the free resin formed during polymerisation and the resin component to be grafted onto the Polypentenamer. The regulators are generally used in quantities of from 0.01 to 0.3 part by weight. Ester wax lubricants such as, for example, butyl stearate, N,N'-di-stearyl ethylene diamine or mineral oil and/or polypropylene glycol ether lubricants may also be added to the solution in quantities of up to 5 percent, based on the polymer-monomer solution used.

Polymerisation is initiated in a nitrogen atmosphere as known per se by the addition of from 0.01 to 0.5 parts by weight of oil-soluble, radically decomposing initiators such as benzoyl peroxide, dicumyl peroxide, tert.-butyl peroxide, tert.-butyl perbenzoate or azo-bis-isobutyronitrile. A combination of two initiators with different half-life times is preferably used.

At temperatures of from 60° C. to 120° C. and preferably from 70° C. to 90° C., polymerisation is continued with intensive stirring to produce a strong shear effect up to a monomers-into- polymer conversion of from 15 percent to 30 percent. If the monomer conversion rate us is any higher, the viscosity of the solution mixture undergoes a sharp increase. Accordingly, the prepolymer must be polymerised in suitable units, for example, in screws, up to fairly high conversion rates, and then degasified, extruded and granulated in another screw, if higher conversion rates are desired. It is possible, depending upon the conversion rate obtained, to adjust the mixture as a whole to the required elastomer content with resin prepared separately from the aforementioned monomers or with other polymers compatible therewith, such as polyvinyl chloride, for example.

An alternative method, and one which is preferred for the purposes of the invention, of continuing polymerisation up to fairly high conversion rates comprises converting the prepolymer into an aqueous suspension and polymerising this suspension up to conversion rates of more than 95 percent of the monomers used at temperatures of from 90° C. to 160° C.

The ratio of prepolymer to aqueous suspension liquid is from 1:1 to 1:3, and preferably from 1:1.5 to 1:2.0. Suitable suspending agents include the conventional water-soluble suspending agents such as α-methyl cellulose, 2-ethylhexylmethacrylate, water-soluable copolymers of acrylic acid and methacrylic acid, polyvinyl alcohol, partly hydrolysed polyvinyl acetate and so on. It is preferred to use from 0.05 percent to 4 percent by weight, based on the aqueous phase, of hydrolysed polyvinyl acetate of K-value 40–100 (hydrolysis carried out to 80–90 percent) in combination with from 0.01 percent to 0.1 percent by weight of sodium sec.-alkyl sulfonates or dodecylbenzene sulfonates.

Polymerisation may also be carried out as pure emulsion polymerisation starting with an emulsion of the Polypentenamer. Basically, the procedure is then as described above.

The Polypentenamer used can be obtained by known methods (Angew. Chemie 76 (1964), pp. 756–772), including the ring-opening polymerisation of cyclopentene with mixed catalysts, for example, $(Al(C_2H_5)_3 + WCl_6$ or $Al(C_2H_5)_3 + MoCl_2$. It should have Mooney values ML–4 below 100 and preferably from 20–80.

During polymerisation a graft polymer of polymerised monomers on Polypentenamer is formed in mixture with a copolymer of the homopolymer of the grafting monomers. The grafting ratios of the graft polymer proper, defined by the ratio of grafted-on monomers (i.e combined chemically with the Polypentenamer), to the Polypentenamer base are between 0.1 and 3.0.

At the end of the suspension polymerisation, the thermoplastic-elastic moulding compositions formed are separated from the aqueous phase by filtration, washed and dried. Volatile constituents may be removed from the polymer by fusing in single- or multiple-screw extruders in a vacuum. Lubricants, stabilizers, dyes, pigments and other additives may be incorporated. Finally the polymer may be granulated.

The products obtained by the process according to the invention can be shaped into a variety of articles by the methods normally employed with thermoplastic moulding compositions. For example, they can be injection-moulded or extruded into profiles, sheeting and tubing. The sheeting can be further processed by vacuum or pressure forming into housings, containers and so on.

The invention is illustrated by the following examples in which the parts indicated are parts by weight unless otherwise stated.

EXAMPLE 1

A 40-liters agitation-type autoclave of stainless steel is loaded with a gel-free solution of 640 g. of Polypentenamer (Mooney ML–4=37) in 5120 g. of styrene and 1440 g. of acrylonitrile. The solution contains 8 g. of 2,6-di-tert-butyl-methylphenol for stabilizing purposes and 8 g. of tert.-dodecyl mercaptan as a molecular weight regulator. The reaction vessel is fitted with an anchor agitator comprising longitudinal braces. A few baffles project vertically from the lid of the vessel into the reaction zone, their function being to subdivide the channels left free during rotation of the anchor stirrer. The distance between the outermost rim of the anchor stirrer and the wall of the vessel is 1.5 cm. The air in the reaction vessel is replaced by a nitrogen atmosphere, the polymerisable reaction mixture is activated with a solution of 16 g. of benzoyl peroxide and 8 g. of tert.-butyl peroxide in 800 g. of styrene, and the temperature is raised to about 75° C. The stirring speed is adjusted to 100 r.p.m. After a reaction time of 2 hours, 27 percent of the monomers are polymerized. The resulting prepolymer solution is then converted with intensive stirring (120–200 r.p.m.) with a solution of 24 g. of an approximately 90 percent hydrolysed polyvinyl acetate of K-value 50 and 3 g. of a sodium sec.-alkyl sulfonate in 16000 g. of water into an aqueous suspension which is then further polymerised as follows: 4 hours at 80° C., 2 hours at 90° C., 3 hours at 110° C., 2 hours at 130° C., and 2 hours at 150° C.

The reaction product accumulates in the form of small beads with an average diameter of from 1 to 2 mm. which are readily separated and dried. The yield is 7950 g. of 98 percent of the theoretical. The dried reaction product is fused in a screw and degasified, 0.2 percent of 2,6-di-tert.-butyl-4-methyl phenol are incorporated and the product is extruded and finally granulated. The technological data were determined on injection moulded standard test bars. The results are compared in table 1, column 1, with those of the comparison tests.

COMPARISON EXAMPLE A

As in example 1, a prepolymer is prepared under the same condition from 640 g. of cis-polybutadiene (Mooney ML–4 =40), 5920 g. of styrene, 1440 g. of acrylonitrile, 8 g. of tert.-dodecyl mercaptan and 8 g. of 2,6-di-tert.-butyl-3-methylphenol by initiation with 16 g. of benzoyl peroxide and 8 g. of di-tert.-butyl peroxide. After about 2 hours, 27.5 percent of the nonomers are polymerized. The prepolymer is converted into an aqueous suspension with a solution of 24 g. of an approximately 90 percent hydrolysed polyvinyl acetate (K-value 50) and 3 g. of a sodium sec.-alkyl sulfonate in 16000 g. of water, and the suspension thus obtained is further polymerised as follows: 4 hours at 80° C., 2 hours at 90° C., 3 hours at 110° C., 2 hours at 130° C., and 2 hours at 150° C., The polymer 98 percent of which has accumulated in bead form is worked up as described in example 1, is repeated with the modification that a soluble emulsion polybutadiene of Mooney value Ml–4 = 38 is used instead of the Polypentenamer. The polymer which is obtained in substantially the same yields as in example 1 and A is moulded into standard test bars on which the technological data are measured. The results are set out in table 1, column B.

As can be seen from table 1, moulding composition of example 1, prepared by the process according to the invention shows a significantly improved resistance to ageing in comparison with the moulding compositions of comparison examples A and B. The moulding composition according to the invention further has a greater ball indentation hardness and a greater spiral length, an indication of the improvement in processability. Since these advantages of the moulding composition according to the invention are now offset by a reduction in any of the other important technological properties, the moulding composition of example 1 is clearly superior to those of comparison examples A and B.

| Example | 1 | A | B |
|---|---|---|---|
| Polypentenamer | 8 | | |
| Cis-polybutadiene | | 8 | |
| Emulsion polybutadiene | | | 8 |
| Notched impact strength, kp. cm./cm.² according to DIN 53453 at— | | | |
| 20° C | 11.1 | 11.0 | 10.5 |
| 0° C | 8.4 | 8.1 | 7.8 |
| −20° C | 7.3 | 7.6 | 6.1 |
| −40° C | 4.0 | 4.0 | 3.8 |
| Impact strength in kp. cm./cm.² according to DIN 53453 at— | | | |
| 20° C | 65 | 60 | 70.8 |
| −40° C | 40.5 | 38 | 45.0 |
| Vicat softening point in ° C. according to VDE 0302 | 101 | 101 | 101 |
| Ball indentation hardness in kp./cm.² according to DIN 53456 | 990 | 805 | 940 |
| Spiral length in cm. following injection of spiral mouldings at 240° C | 72 | 64 | 63 |
| Ageing as measured in impact strength [1] in kp. cm./cm.² DIN 53453 after ageing in the Xenon test after— | | | |
| 0 hours | 65 | 60 | 70.8 |
| 50 hours | 57.5 | 15.4 | 25.0 |
| 100 hours | 52.1 | 13.8 | 18.5 |
| 150 hours | 45.0 | 10.8 | 14.2 |

[1] Decrease in impact strength.

Example 2

λ parts by weight of Polypentenamer (Mooney value ML–4 = 47) are dissolved in 82 parts by weight of styrene in the presence of 0.1 part by weight of an oxidation stabilizer in a reaction vessel of the kind described in example 1. Following the addition of 0.1 part by weight of a chain regulator, the reaction mixture is activated with a solution of 0.1 part by weight of benzoyl peroxide and 0.1 part by weight of di-tert.-butylperoxide and polymerised at a stirring speed of 100 r.p.m. at 70° to 80° C., up to 25 percent conversion. The prepolymer is then converted into an aqueous suspension with a solution of 0.1 part by weight of partly hydrolysed polyvinyl acetate (K-value 50) and 0.04 part by weight of a sodium sec.-alkyl sulfonate in 250 parts by weight of water, and the suspension thus obtained is further polymerised as follows: 3 hours at 75° C., 1 hour at 80° C., 1 hour at 90° C., 2 hours at 110° C., 2 hours at 130° C., and 3 hours at 150° C. The polymer acccumulates in bead form in a yield of about 97.5 percent and may readily be separated from the aqueous phase. The bead polymer is dried, degasified by fusion in a screw and finally injected-moulded into test specimens. The following technological data are measured:

Notched impact strength in kp.cm/cm² according to DIN 53453 at
- 20° C. — 8.6
- 0° C. — 6.7
- −20° C. — 5.6
- −40° C. — 3.8

Impact strength in kp.cm/cm² according to DIN 53453 at
- 20° C. — 52
- −40° C. — 30

Ball indentation hardness according to DIN 53456 — 730

Vicat softening point in °C. according to VDE 0302 — 88

Example 3

Three solutions (A, B and C) with different Polypentenamer contents (Mooney value ML–4 =35) are polymerised in accordance with the procedure described in example 1. The technological data obtained are set out in table 3.

TABLE 3

| Solutions | A | B | C |
|---|---|---|---|
| Polypentenamer content in percent | 10 | 12 | 15 |
| Styrene content in percent | 72 | 70 | 67 |
| Acrylonitrile content in percent | 18 | 18 | 18 |
| Notched impact strength in kp.cm./cm.² according to DIN 53453 at— | | | |
| 20° C | 15.4 | 16.7 | 18.5 |
| 0° C | 11.7 | 14.2 | 14.8 |
| −20° C | 11.1 | 13.0 | 11.7 |
| −40° C | 9.3 | 11.1 | 8.4 |
| Impact strength in kp. cm./cm.² according to DIN 53453 at— | | | |
| 20° C | 85.0 | 97.5 | 117.1 |
| −40° C | 42.5 | 53.3 | 89.9 |
| Ball indentation hardness in kp./cm.² | 900 | 820 | 700 |
| Vicat softening point in ° C. according to VDE 0302 | 101 | 99 | 97 |

Example 4

In this example, a solution of 8 g. of Polypentenamer (Mooney–ML–4 =35) in 15 parts by weight of styrene, 10 parts by weight of acrylonitrile and 57 parts by weight of methyl methacrylate, to which 0.2 part by weight of antioxidant and 0.1 part by weight of a molecular weight regulator had been added, is activated with a solution of 0.3 part by weight of benzoyl peroxide and 0.1 part by weight of tert.-butyl perbenzoate in 10 parts by weight of styrene, and polymerised at 75° C. up to a monomer conversion of 23 percent. After this prepolymer had been suspended in a solution of 0.5 part by weight of partly hydrolysed polyvinyl acetate and 0.04 part by weight of a sodium sec.-alkyl sulfonate in 200 parts by weight of water, polymerisation is continued for 4 hours at 75° C., 2 hours at 90° C., 2 hours at 110° C., and 2 hours at 130° C. The polymer is isolated and worked up as already repeatedly described, and is found to have the following properties:

Notched impact strength in kp.cm./cm.² at
- 20° C. — 14.8
- 0° C. — 10.5
- −20° C. — 9.3
- −40° C. — 7.0

Impact strength in kp.cm./cm.² at
- 20° C. — 30.4
- −40° C. — 25.4

Ball indentation hardness in kp./cm.² — 770

Vicat softening point °C. — 81

We claim:

1. Thermoplastic-elastic moulding compositions of:
   A. 5 to 20 parts by weight of an elastomeric polypentenamer as graft base; and
   B. 95 to 80 parts by weight of
      a. styrene, side-chain- or nuclear-substituted styrene, methyl methacrylate or mixtures thereof,
      b. acrylonitrile, methacrylonitrile, esters of acrylic-, methacrylic- and fumaric acid and mixtures thereof, the alcohol component in the esters containing from 1 to 4 carbon atoms, the ratio of (a) to (b) being from 100:5 to 50:50, wherein at least part of the monomers B have been graft-polymerised onto polymer A.

2. A process for producing a thermoplastic-elastic moulding composition which comprises dissolving
   A. 5 to 20 parts by weight of an elastomeric polypentenamer with a Mooney viscosity ML–4 of from 20 to 80 in
   B. 95 to 80 parts by weight of
      a. styrene, side-chain- or nuclear-substituted styrene, methyl methacrylate or mixtures thereof and
      b. acrylonitrile, methacrylonitrile, esters of acrylic-, methacrylic- and fumaric acid and mixtures thereof, the alcohol component in the esters containing from 1 to 4 carbon atoms, the ratio of (a) to (b) being from 100:5 to 50:50 and subjecting the resulting rubber/monomer solution to radical polymerization by the addition of a radical initiator which is soluble in the solution.

3. The process of claim 2, wherein said polymeriation is carried out with shear-promoting agitation at 60° to 120° C. up to a conversion of 15 to 30 percent of the monomers and resulting prepolymer is converted into a suspension and polymerization is completed at a temperature of from 80° to 100° C. and up to conversions of more than 95 percent.

4. The moulding compositions of claim 1 wherein (a) is styrene and (b) is acrylonitrile.

5. The moulding compositions of claim 1 wherein each of (a) and (b) is methyl methacrylate.

* * * * *